(12) United States Patent
Thomas

(10) Patent No.: US 10,985,539 B1
(45) Date of Patent: Apr. 20, 2021

(54) UNMANNED AERIAL VEHICLE LINE AND CABLE STRINGING SYSTEM

(71) Applicant: William Thomas, Santa Rosa, CA (US)

(72) Inventor: William Thomas, Santa Rosa, CA (US)

( * ) Notice: Subject to any disclaimer, the term of this patent is extended or adjusted under 35 U.S.C. 154(b) by 165 days.

(21) Appl. No.: 16/043,028

(22) Filed: Jul. 23, 2018

(51) Int. Cl.
    *H02G 1/04* (2006.01)
    *B64C 39/02* (2006.01)
    *H02G 1/02* (2006.01)

(52) U.S. Cl.
    CPC .............. *H02G 1/04* (2013.01); *B64C 39/02* (2013.01); *B64C 39/024* (2013.01); *H02G 1/02* (2013.01); *B64C 2201/12* (2013.01); *B64C 2201/128* (2013.01)

(58) Field of Classification Search
    CPC . H02G 1/02; H02G 1/04; B64C 39/02; B64C 39/024; B64C 2201/12; B64C 2201/128
    See application file for complete search history.

(56) References Cited

U.S. PATENT DOCUMENTS

| | | | |
|---|---|---|---|
| 2016/0023761 A1* | 1/2016 | McNally | H02G 1/02 29/407.01 |
| 2016/0309346 A1* | 10/2016 | Priest | B64C 39/024 |
| 2017/0066530 A1* | 3/2017 | Salzmann | B64C 39/024 |
| 2017/0113799 A1* | 4/2017 | Kovac | G05D 1/104 |
| 2017/0144756 A1* | 5/2017 | Rastgaar Aagaah | G05D 1/0094 |
| 2017/0200530 A1* | 7/2017 | Davis | H02G 1/02 |
| 2017/0328814 A1* | 11/2017 | Castendyk | G01N 33/18 |
| 2018/0039286 A1* | 2/2018 | Tirpak | B64F 1/00 |

* cited by examiner

*Primary Examiner* — Peter Dungba Vo
*Assistant Examiner* — Jeffrey T Carley
(74) *Attorney, Agent, or Firm* — Gary Hoenig

(57) ABSTRACT

An unmanned vehicle line and cable string apparatus is provided and the method of use thereof. A small drone has a shot line canister loaded with an inside wound shot line string spool. Shot line is strung between power line towers wherein the inside shot line string end is attached to a remotely controlled released shot line sinker. The sinker is deployed near the proximate tower, the drone is directed to the distal tower deploying shot line from the shot line canister. The shot line canister, having a remotely controlled jettison mechanism and an end of shot line detection mechanism, is jettisoned at the distal power line tower. As shot line is dispensed, the vehicle loses weight thereby extending the flying time, distance, and maneuverability particularly as the vehicle approaches the distal tower. Because the shot line is deployed and not dragged, the impact of inclement weather conditions is minimized.

8 Claims, 12 Drawing Sheets

UNMANNED AERIAL VEHICLE LINE AND CABLE STRINGING SYSTEM

FIELD OF THE INVENTION

The invention relates to unmanned aerial vehicle line and cable stringing systems and more particularly to a line and cable stringing drone apparatus and method of use thereof.

BACKGROUND OF THE INVENTION

Stringing power lines, particularly between widely spaced high tension towers, can be challenging especially when the ground between the towers is inaccessible as is the case over a canyon or waterways. Various techniques for stringing power lines between the towers are utilized depending upon the terrain. For example, when the ground between the towers is accessible, the power line can be reeled out by truck between the towers. If the ground between the towers is inaccessible or otherwise obstructed, other means for stringing the power lines is necessary. One alternate stringing technique is accomplished by first routing a lightweight string or lead line between the proximate and distal towers. The lightweight line is next attached to a heavier rope or cable that is pulled over a pulley mounted on the distal tower, replacing the lightweight lead line. The heavier rope, capable of withstanding the tension required to pull the power line or cable, is now attached to the power line or cable and pulled to route the power line or cable into place. The challenge is routing the lightweight string or lead line between the towers.

Helicopters are often utilized to pull lightweight rope or lead lines between the towers when the power line weight to be strung exceeds the helicopter load ratings; however, helicopter installations are typically costly and their use is limited by weather conditions. Because downed power lines are a common occurrence during storms, the use of helicopters to string power lines during inclement storm conditions is often restricted thereby preventing their use. Regardless of the weather conditions, the cost of helicopter installations is high.

Alternatively, line throwing guns are utilized wherein a smooth bore gun fires a metal slug projectile having a shot line string attached to the slug and shot from the proximate tower to the distal tower. The distal end of the shot line is then attached to a heavier rope and so on. Line throwing guns have significant limitations. Line throwing guns are difficult to use in stormy weather, have poor accuracy, have distance limitations particularly in wet or windy weather conditions, and are prohibited for use in built up areas.

Drones have been utilized to drag a lead line from the proximate tower to the distal tower. However, a large drone is required because while dragging a lead line and the distance increases from the proximate tower, the weight of the lead line being dragged by the drone increases thereby also significantly increasing the power and lift required by the drone. Consequently, large drones are required to provide the necessary lift and travel distance to overcome the drag from the lead line. Unfortunately, large drones are difficult to maneuverer amongst guy lines and other features on the towers and are generally complicated to deploy due in part to licensing and FAA restrictions. Therefore there is a need for an improved line and cable stringing apparatus and method for installing power lines between towers at distance and having inaccessible ground between them. In particular there is a need for a system to string power lines during inclement weather conditions over inaccessible ground.

SUMMARY OF THE INVENTION

Accordingly the present invention is directed to a power line and cable stringing apparatus and method of use thereof. An unmanned aerial vehicle having line and cable stringing deployment features for laying a lightweight lead line between power line towers is provided. The present invention dispenses shot line to be used as a lead string or line between power line towers. Shot line is a light weight string typically attached to a projectile and used with a line-throwing gun for passing a cable to a wrecked vessel. Shot line is provided in spool form and is inside wound in a manner to facilitate the string inside end of the spool to pull out of the spool with minimal resistance.

The present invention comprises a radio controlled drone having a shot line deployment undercarriage assembly. The undercarriage assembly, fitted to the bottom surface of the drone, comprises a cylindrically shaped shot line canister horizontally disposed aligned with the bottom surface of the drone and removably and longitudinally hung from a canister carriage.

A user provided shot line string spool is inserted into the shot line canister. The shot line spool inside end is routed through a polymeric gaiter centrally mounted in the rear surface of the shot line canister and tied to a shot line sinker hung from a sinker latch fixed to the canister carriage near the rear end of the canister carriage. The sinker latch has a solenoid activated sinker latch release mechanism being in direct electrical communication with the drone remote control receiver unit. The sinker release mechanism is arranged to release the shot line sinker when the sinker solenoid is selectively activated by a user issuing a sinker release command from the remote control transmitter.

The shot line canister is hung from the canister carriage by front and rear canister hangers. The shot line canister is wedged into position between the canister hangers having slots receiving latches on the canister carriage and a ball plunger disposed in the canister carriage with the ball of the ball plunger contacting the rear surface of the shot line canister. The detent force of the ball plunger is selected to depress when the shot line jams within the shot line canister thereby facilitating the jettison of the shot line canister thereby preventing damage to the drone. A canister jettison solenoid activated canister release mechanism mounted on the canister carriage is also provided. The canister jettison solenoid being in direct electrical communication with the drone remote control receiver unit is selectively activated by a user with canister release command issued through the remote control transmitter. The canister release mechanism when activated is arranged to push the shot line canister to the rear, depressing the ball plunger thereby releasing the shot line canister from the canister hanger latches mounted on the canister carriage. The user thereby is provided with a means for manually jettisoning the shot line canister.

The method of preparing the drone for deployment includes the steps of selecting a shot line spool having a shot line length equal to or greater than the distance between the proximate and distal power line towers, inserting the user provided shot line spool into the shot line canister, securing the shot line string inside end to the shot line sinker, inserting the canister spool retaining detent pin to secure the shot line spool, and securing the shot line string outside end to the end of string canister release lever. The method for utilizing the begins the prepared drone being first directed by the user utilizing the remote control transmitter to a location near the proximate power line tower where upon arrival the shot line sinker is released by user command to begin stringing the lead line. The drone is now directed by the user to fly to distal power line tower dispensing shot line during flight tracing the path of the power line to be strung. Upon arrival at the distal power line tower location the user jettisons the shot line canister by issuing a canister release command activating the canister jettison solenoid.

Having a means for releasing the shot line canister from the drone is important so as to recover from circumstances wherein the dispensed shot line fouls resulting in a tethering of the drone. Also, in circumstances wherein the shot line spool is emptied, the shot line string end, if secured to the drone would also result in tethering the drone. Therefore the apparatus has features to jettison the shot line canister automatically when the shot line fouls or the shot line spool is empty.

The line and cable stringing drone apparatus according to the present invention exhibits numerous advantages over the prior art including extended flying range resulting from the drone becoming lighter as the shot line is deployed, elimination of a dragging line, operational in inclement weather, deployable in many circumstances where other methods cannot be utilized, and maneuverable within obstructions and confines. These and other advantages of the present invention overcome many of the disadvantages of the prior art.

BRIEF DESCRIPTION OF THE DRAWINGS

The accompanying drawings, which are incorporated in and constitute a part of this specification, illustrate embodiments of the invention and, together with the description, serve to explain the features, advantages, and principles of the invention.

In the drawings.

DETAILED DESCRIPTION OF THE INVENTION

Although particular embodiments of the invention have been described in detail for purposes of illustration, various modifications may be made without departing from the spirit and scope of the invention. Where examples are presented to illustrate aspects of the invention, these should not be taken as limiting the invention in any respect.

Figure 1:
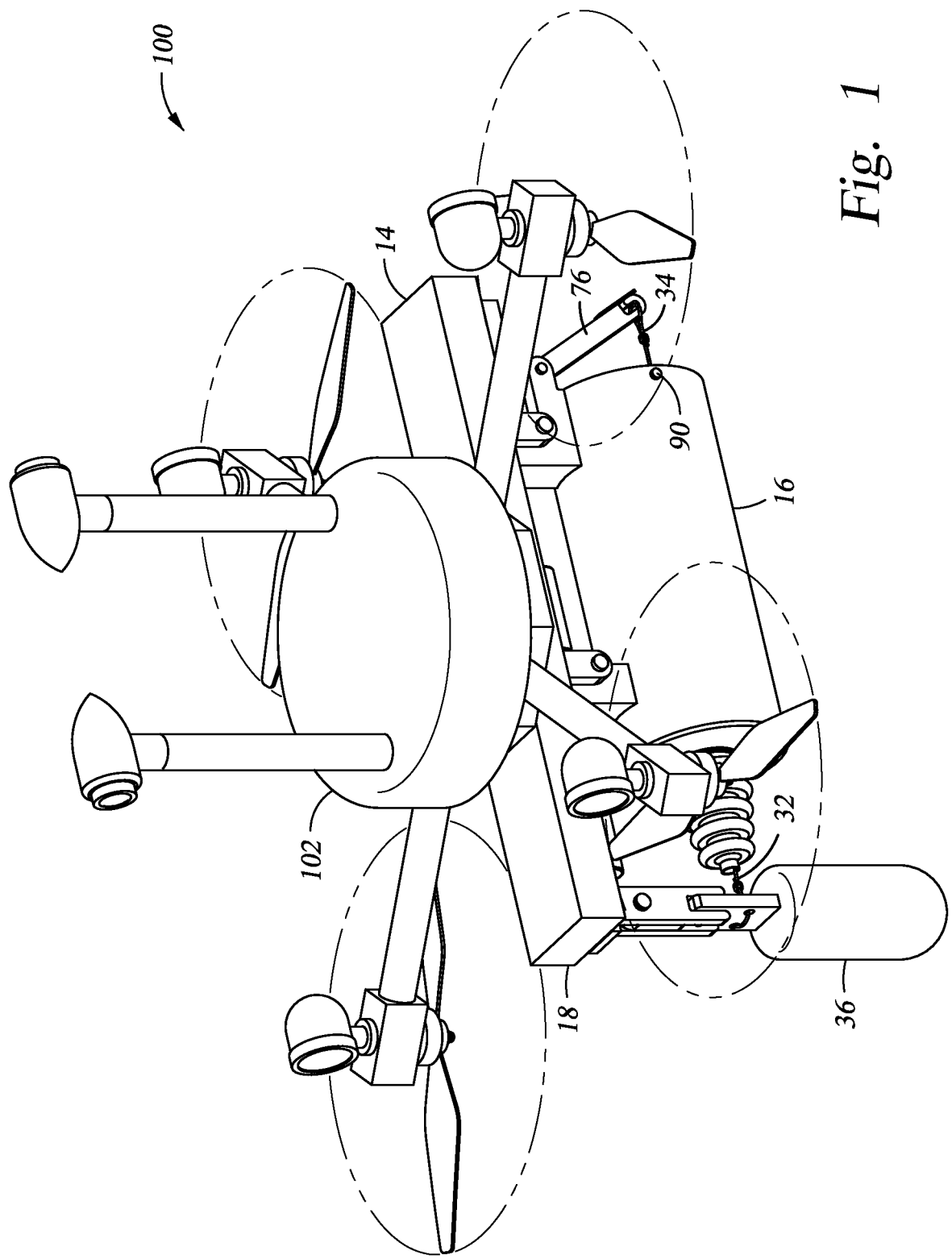
FIG. 1 is a perspective view of the line and cable stringing drone apparatus according to the present invention.
Figure 2:
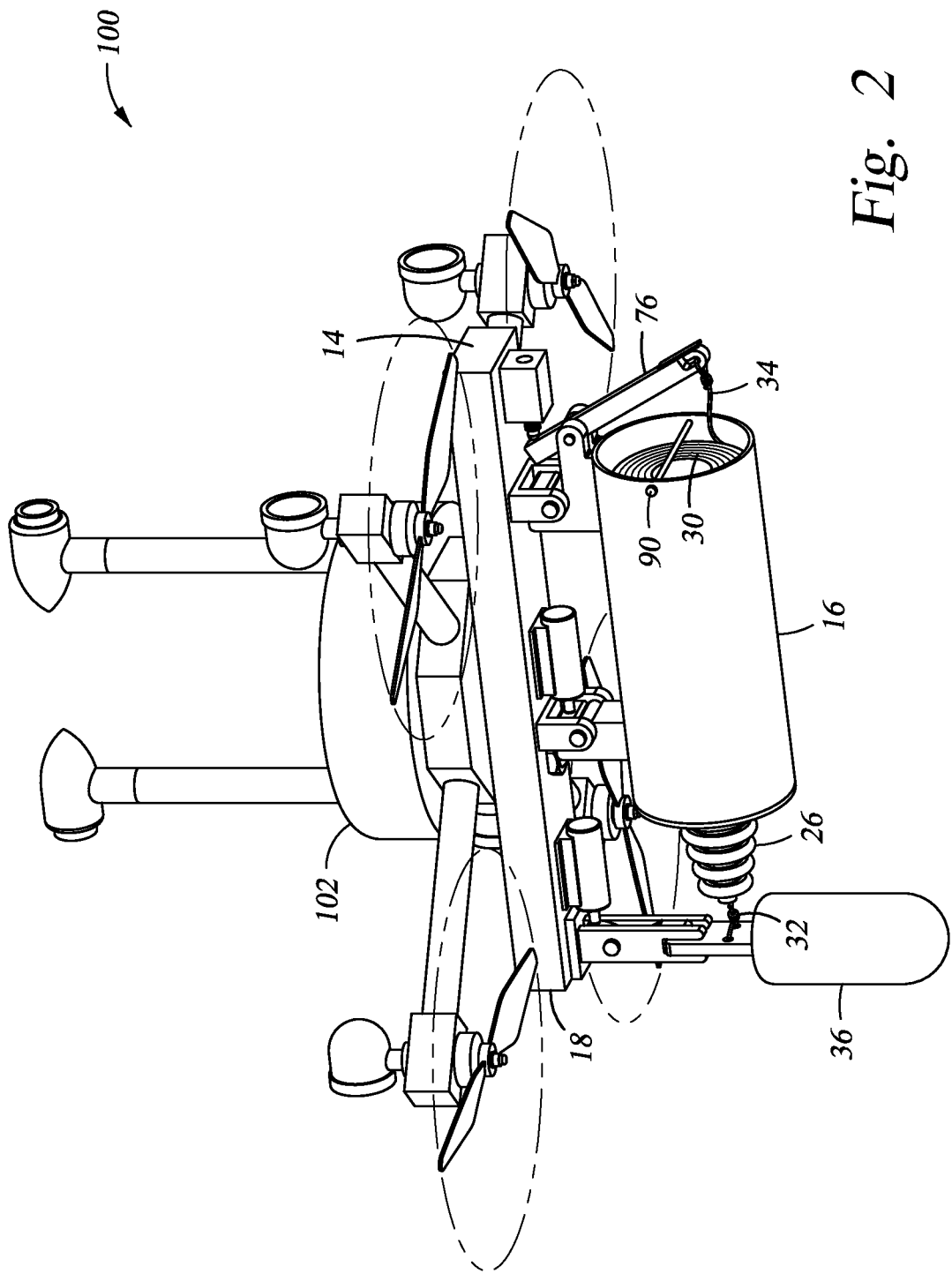
FIG. 2 is a bottom perspective view of the line and cable stringing drone apparatus of FIG. 1 wherein the shot line dispensing canister latched to the canister carriage of the canister carriage assembly is shown with the canister carriage assembly in position and affixed to the bottom of the drone.
Figure 3:
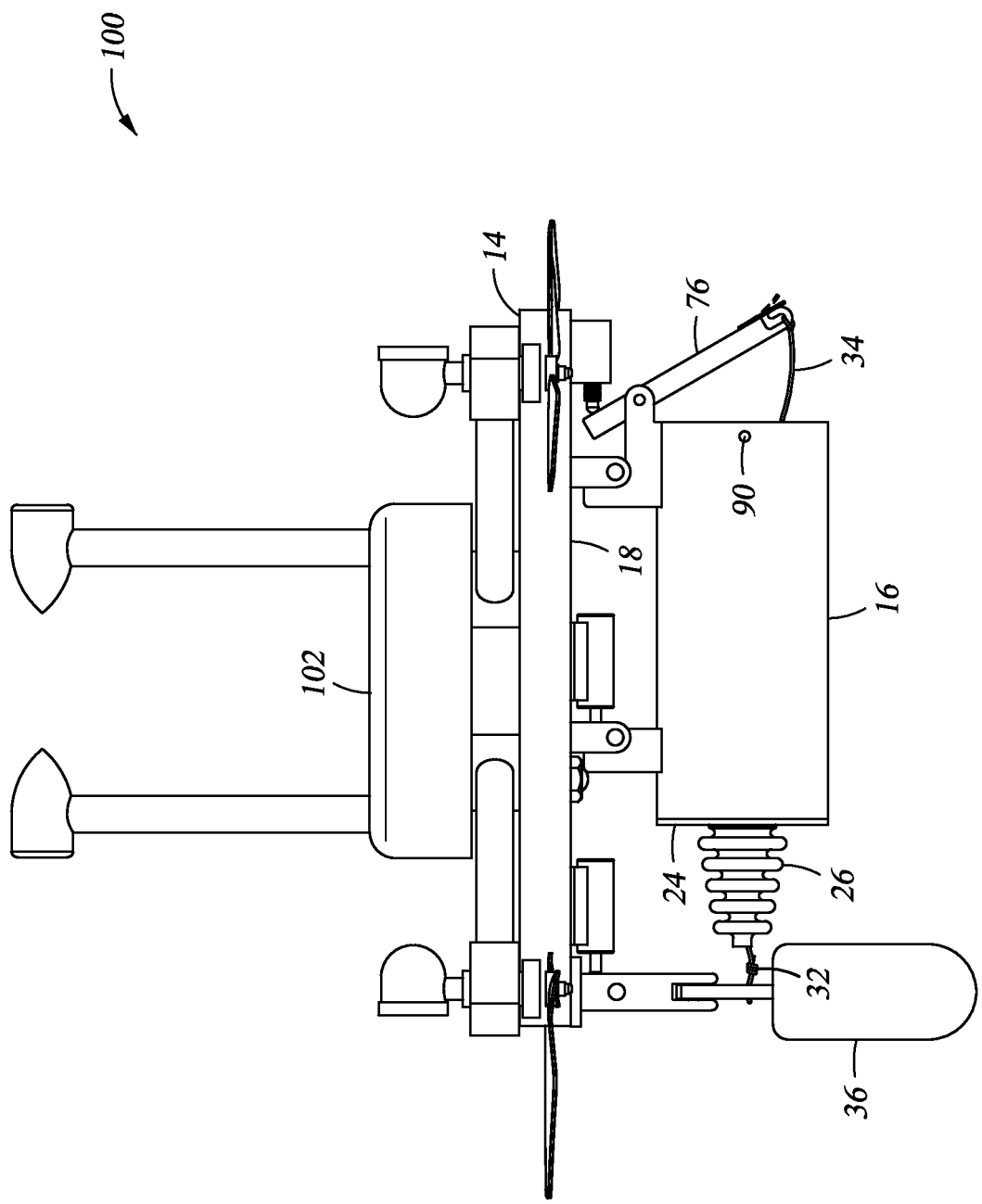
FIG. 3 is a right side elevation view of the line and cable stringing drone apparatus of FIG. 1 showing the shot line canister containing an inside wound shot line spool with the inside string end of the spool fastened to the shot line sinker and the outside string end fastened to the canister release lever.
Figure 4:
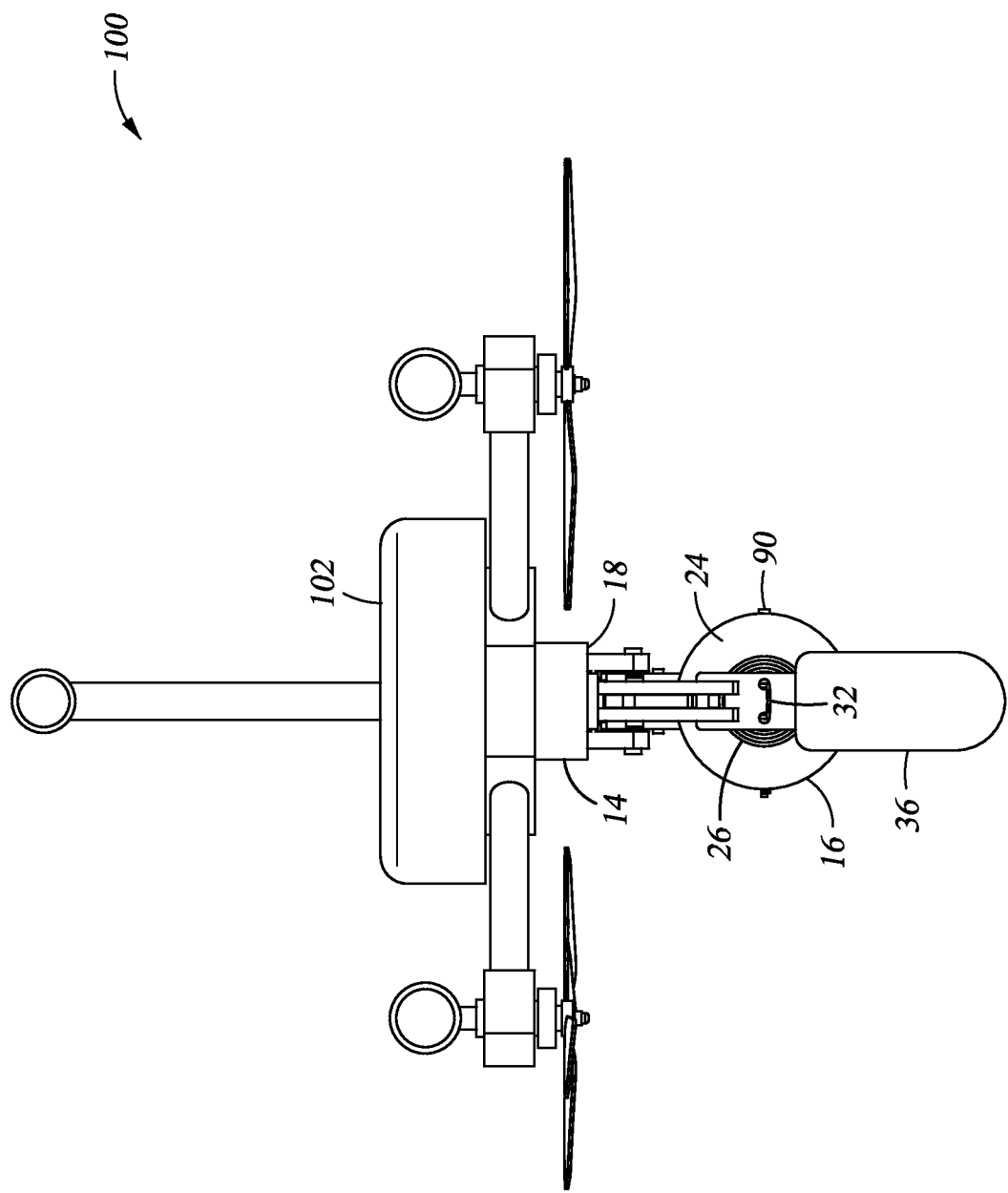
FIG. 4 is a rear elevation view of the line and cable stringing drone apparatus of FIG. 1 showing the shot line sinker in position suspended from the carriage sinker latch mechanism and receiving the inside shot line string end of a user provided shot line spool attached.
Figure 5:
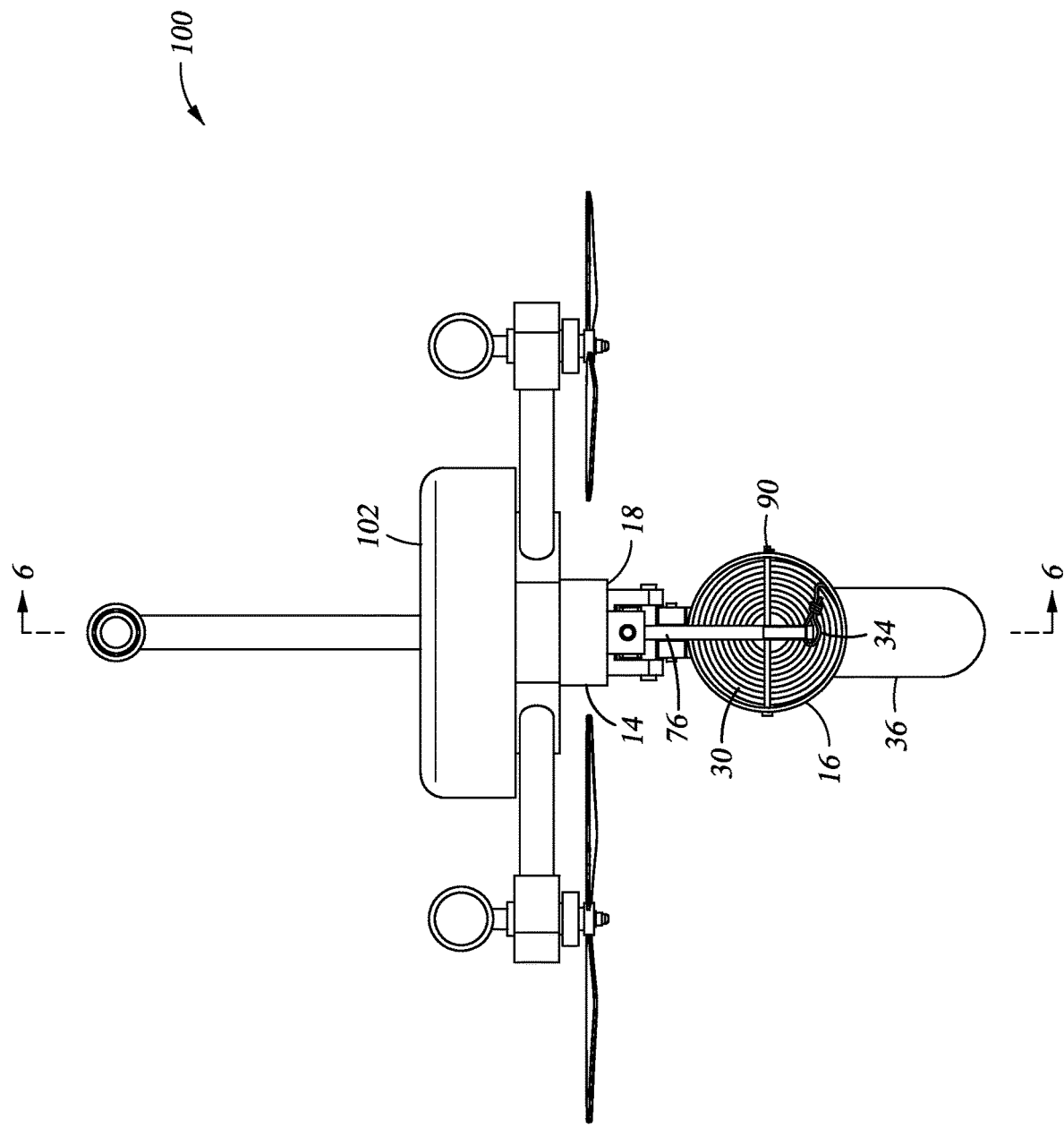
FIG. 5 is a front side elevation view according to the present invention of FIG. 1 wherein the front end of the shot line spool is shown installed within the shot line canister, held in position by the shot line spool retainer pin. The outside shot line string end is shown fastened to the canister release lever.

Now referring in greater detail to the various figures of the drawings wherein like reference characters refer to like parts, there is shown in FIG. 1 a line and cable stringing drone apparatus 100. Referring to FIGS. 1-5, an unmanned aerial vehicle comprises a drone 102 fitted with an undercarriage assembly 14 comprising a shot line canister carriage 18 supporting various latching elements fixed to the bottom surface of the canister carriage 18 removably suspending a shot line canister 16 and a shot line sinker 36 from the bottom of the shot line canister carriage 18. A shot line string spool 30 is disposed within the shot line canister 16 with the shot line string inside end 32 fixed to the shot line sinker 36 and the shot line outside end 34 fixed to an end of string canister release lever 76. The shot line string spool 30 is secured in position by a removable shot line canister spool retaining detent pin 90. Being responsive to commands selectively issued by a user directed remote control radio transmitter unit, shot line string is dispensed by first flying the drone to a first location where the shot line sinker 36 is directed to be released and dropped and then secondly flying the drone to a second location whilst dispensing the shot line string. The shot line canister 16 is released at the second location notwithstanding an early release of the shot line canister 16 triggered by a means for detecting an empty shot line string spool.

Figure 6:
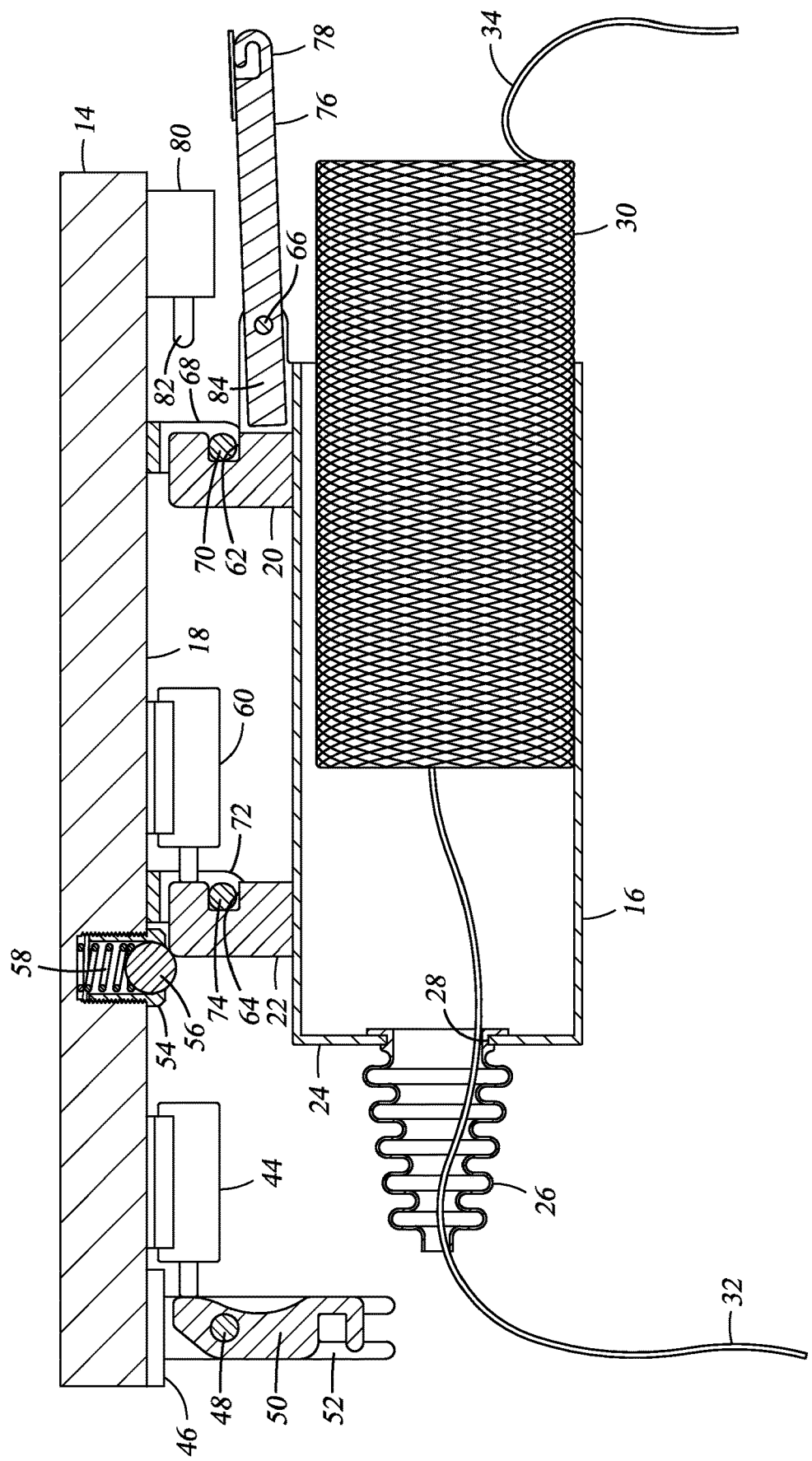
FIG. 6 is a cross section view, similar to the view taken from Line 6-6 of FIG. 5, of the under carriage assembly showing the shot line canister hanging from the front and rear hanger latches of the canister carriage, the various canister mounts and release solenoids and the canister release lever rotated upward to facilitate the insertion of the user provided shot line spool here shown partially loaded into the shot line canister.

In FIG. 6, a cross section view of the undercarriage assembly 14, illustrates details of the various elements fixed to the canister carriage 18 being a rectangular box shaped housing having front and rear ends, a length, a width and a height and having top and bottom surfaces and a longitudinal axis. The shot line canister 16 being longitudinally disposed under the canister carriage 18 is cylindrically shaped having an open front end, a rear cover 24 forming the rear end of the shot line canister 16. A polymeric metering gaiter 26 is retained by a gaiter retaining bore 28 formed concentrically in the shot line canister rear cover 24. The shot line canister 16 further comprises a front hanger 20 and a rear hanger 22 reach respectively fixed to the top of the shot line canister 16, extending upwards from the shot line canister 16. The front surface of the front hanger 20 has a forward facing front hanger slot 62. A canister front hanger latch 68 extending downward from the bottom surface of the canister carriage 18 has a front hanger latch pin 70 slidably received by the canister front hanger slot 62. The front surface of the rear hanger 22 has a similar forward facing rear hanger slot 64 slidably receiving a rear hanger latch pin 74 of a canister rear hanger latch 72. The canister rear hanger latch 72 also extends downward from the bottom surface of the canister carriage 18. The shot line canister 16 is removably attached to the canister front 68 and rear 72 latches by sliding the front 62 and rear 64 canister hanger slots respectively over the front 70 and rear 74 latch pins. A canister carriage ball plunger assembly 54 having a ball plunger detent ball 56 and ball plunger spring 58 is disposed in the bottom surface of the canister carriage 18 with the ball plunger detent ball 56 interfering with the rear surface of the shot line canister rear hanger 22 pushing the rear hanger slot 64 over the rear hanger latch pin 74 thereby securing the shot line canister 16 to the canister carriage 18. The spring constant of canister carriage ball plunger assembly 54 ball plunger spring 58 is selected to provide sufficient force to secure the shot line canister 16 in place during normal operation whilst also permitting the ball plunger detent ball 56 to release the canister rear hanger 22 when the shot line canister 16 is pulled rearward by excessive tension on the shot line string inside end 32.

Also as shown in FIG. 6, a canister jettison solenoid 60 is mounted to the canister carriage 18 and is disposed to contact and push the canister rear hanger 22 rearwards when activated and selected to provide sufficient force to depress the ball plunger detent ball 56 thereby affecting a release of the shot line canister 16. The canister jettison solenoid 60 is in direct electrical communication with the drone receiver providing a means for selectively activating the canister jettison solenoid 60 by a user issuing a canister release command to the drone.

Figure 7:
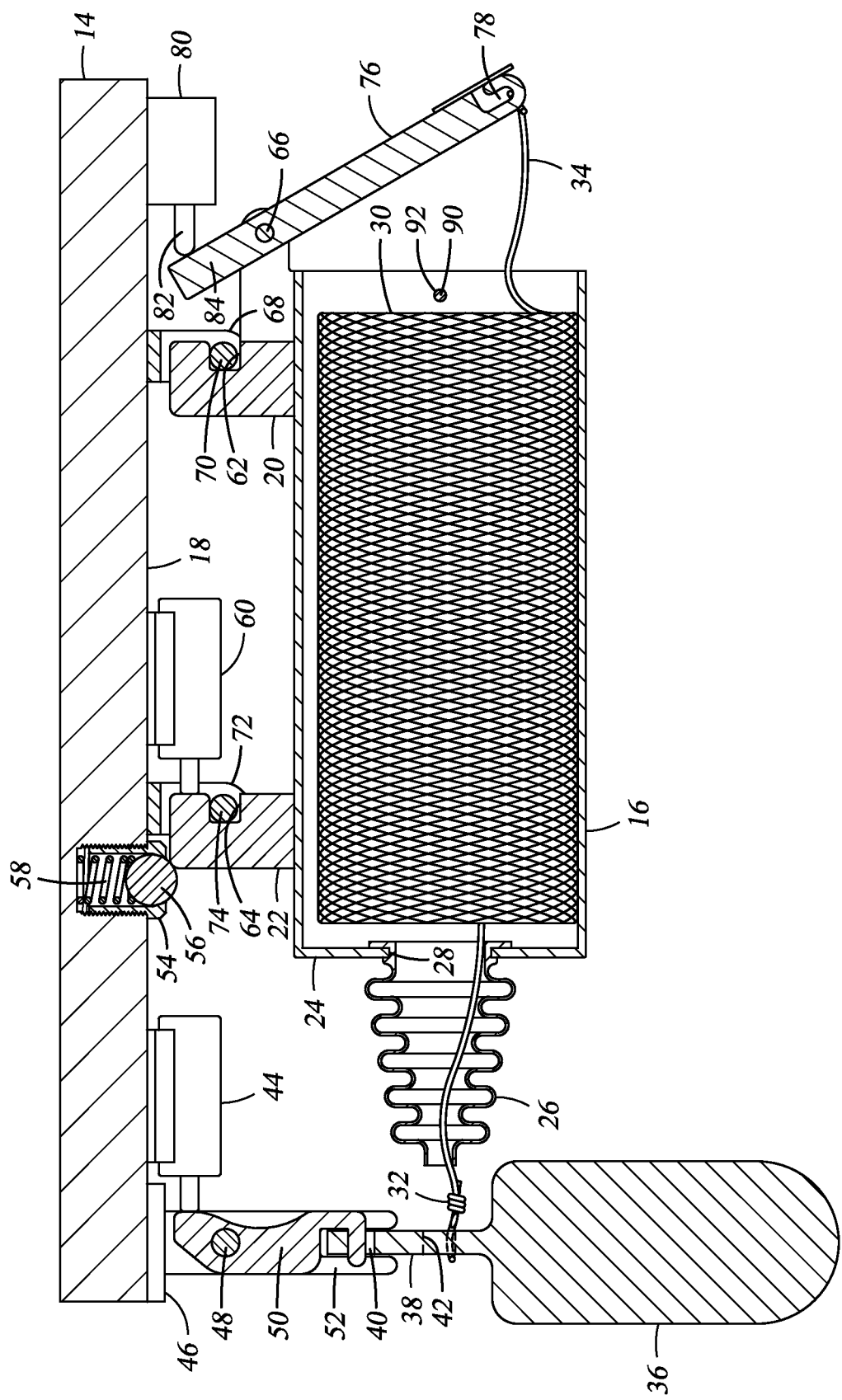
FIG. 7 is a cross section view similar to the view of FIG. 6 showing the shot line spool fully inserted into the string canister with the shot line inside string end secured to the sinker and the shot line string outside end secured to the canister release lever here shown rotated downward across the front end of the string canister with the lever arm resting on the end of string detector switch plunger.

In FIG. 6, the first step a method of preparing the line and cable stringing drone apparatus of the present invention is illustrated of inserting a shot line string spool 30 into the front end of the shot line canister 16. The shot line string spool 30 being an inside wound spool has a shot line string inside end 32 and a string outside end 34. The string inside end 32 is routed through the canister string metering polymeric gaiter 26. The shot line string spool 30 is next slid into the shot line canister 16 as shown in FIG. 7. A shot line canister spool retaining detent pin 90 is now removably installed across the diameter of shot line canister 16 through detent pin bores 92 located near the front end of the shot line canister 16 securing the shot line string spool 30 within the canister. The shot line string outside end 34 is next secured to the string hook 78 fashioned in the distal end of an end of string canister release lever 76. The release lever 76 pivots vertically around the front hanger 20 pivot pin 66 with the release lever arm 84 forming the proximate end of the release lever 76.

Referring again to FIG. 7, the shot line string inside end 32 is next fixed to a shot line sinker 36. The shot line sinker 36 is any suitable sinker having a minimum weight sufficient to drop vertically whilst pulling and dispensing shot line from the shot line string spool 30. The shot line sinker has a vertical hanger tab portion 38 extending from the top of the shot line sinker 36. The vertical hanger tab portion 38 has a string bore 42 receiving the shot line string inside end 32. The vertical hanger tab portion 38 further has a hanger tab latch receiver 40 near the top of the vertical hanger tab portion 38. A carriage sinker latch 46 is mounted to the bottom the canister carriage 18 near the rear end of the canister carriage 18. The carriage sinker latch 46 has a sinker latch release lever mount 52 extending downward with a sinker latch release lever 50 pivotally attached to the lever mount 52 by latch pivot pin 48. Having cooperating latching features, the release lever 50 and release lever mount 52 provide a latching mechanism removably receiving the hanger tab latch receiver 40 of the shot line sinker 36. A sinker latch release solenoid 44 is disposed on the bottom of the canister carriage 18 to press on and open the sinker latch 46 when activated. The sinker latch release solenoid 44, being in direct electrical communication with the radio receiver of the drone, is selectively activated by a user issued drop sinker command. The line and cable stringing drone apparatus is now prepared to be deployed to dispense shot line.

Figure 8:
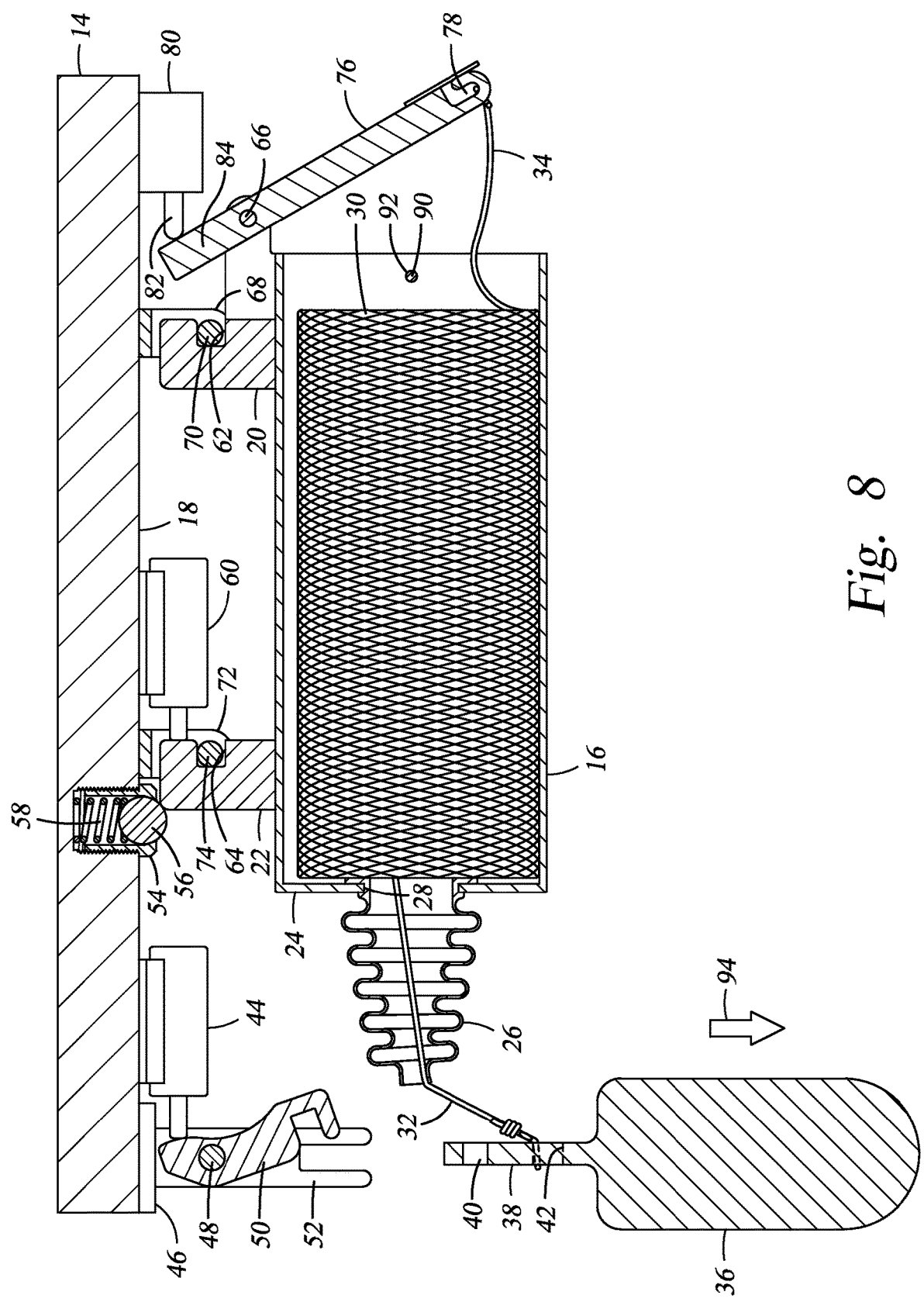
FIG. 8 is a cross section view similar to the view of FIG. 7 showing the provided shot line spool fully inserted into the string canister with the inside lead string end secured to the sinker released from the now open sinker latch being responsive to a user selectively activating the sinker release solenoid by a sinker release command from a remote control transmitter.

In FIG. 8, the line and cable stringing drone apparatus is flown and maneuvered over a selected proximate location to begin dispensing shot line string. Whilst over the proximate location, a user selectively issues a command to the drone receiver to release the shot line sinker 36. Being in direct electrical communication with the radio receiver of the drone, sinker latch release solenoid 44 is activated. The sinker latch release solenoid 44 contacts and presses the sinker latch release lever 50, rotating the release lever 50 around pivot pin 48 thereby opening the sinker latch 46 and releasing the hanger tab latch receiver 40 of the shot line sinker 36. The shot line sinker 36 falls and pulls shot line from the shot line spool 30 in the shot line canister 16.

Figure 9:
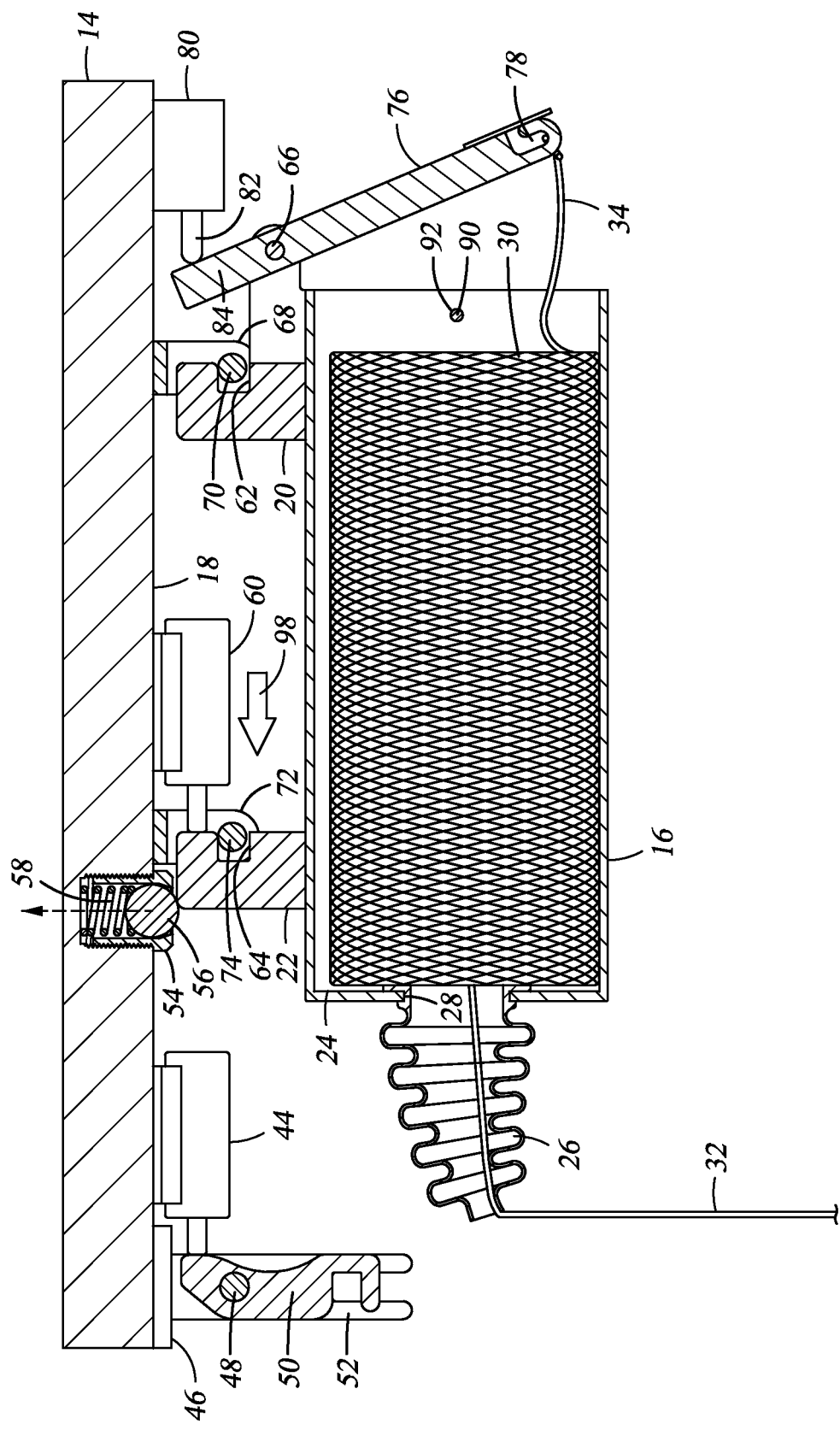
FIG. 9 is a cross section view similar to the view of FIG. 8 showing the shot line canister beginning jettisoned by a user selectively activating the canister jettison solenoid by a canister jettison command from a remote control transmitter wherein the canister is pushed across the detent ball of the canister ball plunger facilitating the release the canister from the front and rear canister hangers.

The line and cable stringing drone apparatus is next flown and maneuvered over a selected distal location whilst dispensing shot line string. An inherent feature of shot line string spools is the low drag imposed on the string during dispensing. Therefore the line and cable stringing drone apparatus can be flown and maneuvered whilst dispensing string with only minimal drag from the dispensing string. With the line and cable stringing drone apparatus positioned over the selected distal location, the next step includes releasing the shot line canister 16 being accomplished by a means for releasing the shot line canister 16 wherein the user selectively issues a canister release command to the drone radio receiver to activate the canister jettison solenoid 60 and release the shot line canister 16. Referring to FIG. 9, the canister jettison solenoid 60 is fixed to the bottom of the canister carriage 18 and disposed to contact and push the front surface of the shot line canister rear hanger 22 rearward as indicated by motion arrow 96 when activated. The ball plunger spring 58 is compressed by the upward displacement of the ball plunger detent ball 56 being responsive to the rearward movement of the shot line canister rear hanger 22. Both the front and rear shot line canister hanger slots 62 and 64 are respectively displaced from the front and rear hanger latch pins 70 and 74. Freed from the front and rear hanger latches 68 and 72 the shot line canister 16 is jettisoned over the selected distal location.

In the event that the shot line string spool 30 is fully deployed or if the shot line sting binds within the shot line string spool, it will be appreciated that the shot line string outside end must be released to avoid tethering of the drone by drag from the dispensed shot line string. If the shot line string is released from the drone the lightweight string has a propensity to drift with the wind thereby inhibiting easy retrieval of the string end. The present invention provides a means for releasing the shot line canister 16 wherein the shot line canister 16 is released when the end of string is detected, the shot line string is fouled, or by user command. The shot line canister 16 drops directly to the ground with the string outside end attached to the canister assembly thereby reducing wind drift of a loose the shot line string.

Figure 10:
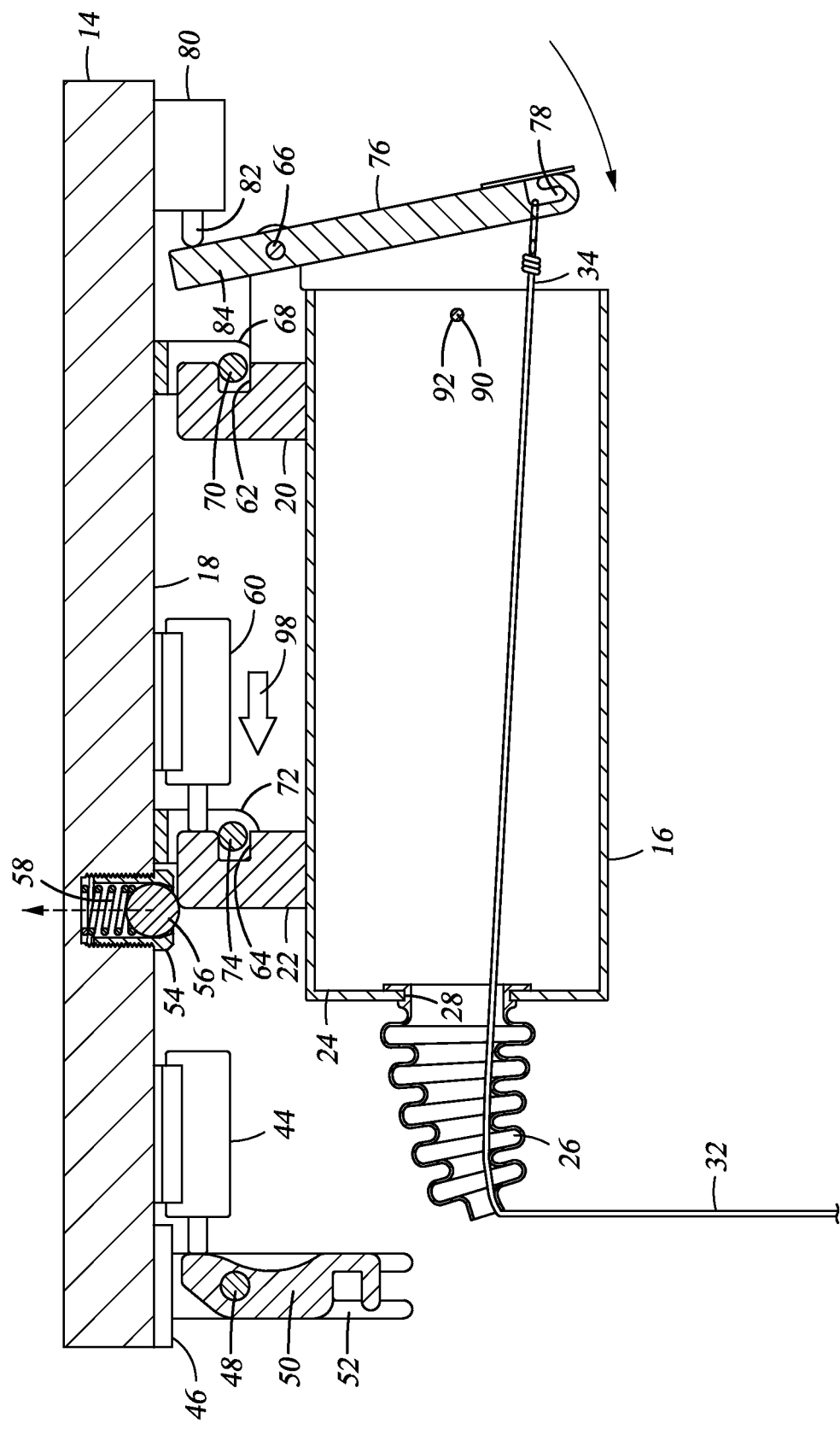
FIG. 10 is a cross section view similar to the view of FIG. 9 showing the shot line fully dispensed with the string outside end pulling the end of string canister release lever thereby rotating string canister release lever arm to contact and activate the end of string detector switch. The string detector switch, being in direct electrical communication with the canister jettison solenoid, activates the canister jettison wherein the canister is pushed across the detent ball of the canister ball plunger facilitating the release the canister from the front and rear canister hangers.

In a first embodiment of the present invention, as in FIG. 10, the carriage jettison solenoid 60 is further in electrical communication with an end of string detector switch 80 mounted on the bottom of the canister carriage 18. The end of string detector switch 80 has a switch plunger 82, operable to activate the switch, is disposed to be depressed by release lever arm 84 when the release lever 76 pivots towards the top of the shot line canister 16. In this first embodiment, the canister jettison solenoid 60 is thereby activated when the release lever 76 is pulled by the shot line string when the shot line string spool 30 is depleted.

Figure 11:
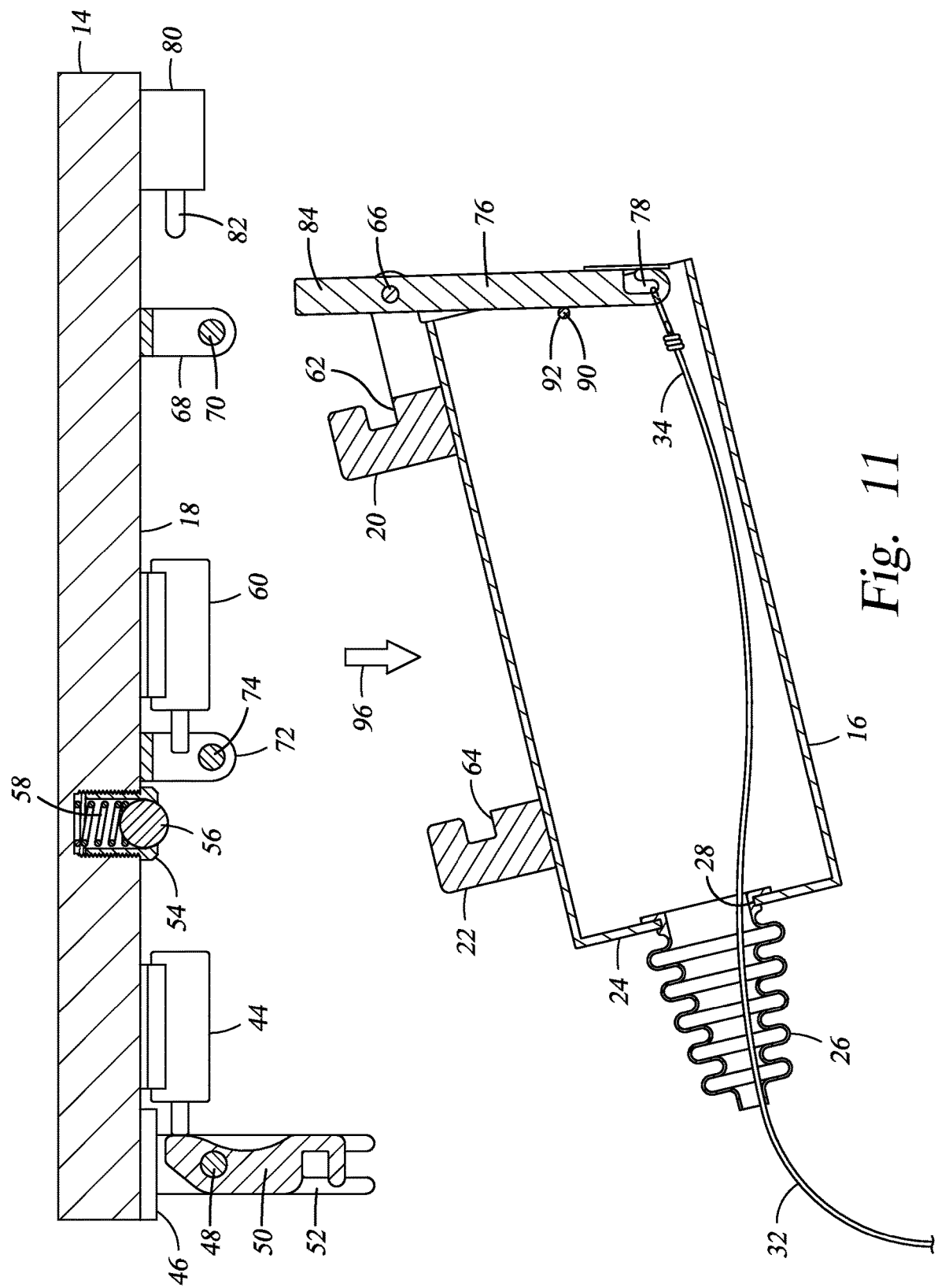
FIG. 11 is a cross section view similar to the view of FIG. 10 showing the shot line canister fully released and separated from the canister carriage a short period of time after activation of the end of string detector switch.

Details of the operation of a means for end of string detection mechanism is illustrated in FIG. 10 wherein, being responsive to an end of string event, the end of string release lever 76, being disposed within the longitudinal vertical plane of the shot line canister 16, pivotally and responsively rotates downward and rearward around the front hanger 20 pivot pin 66 with the release lever arm 84 depressing switch plunger 82 and activating the end of string detector switch 80 as described supra. The shot line canister 16 is shown moving rearward as indicated by rearward motion arrow 98 by the now activated canister carriage jettison solenoid 60 thereby jettisoning the shot line canister 16 from the carriage canister hangers front 68 and rear 74 allowing the shot line canister 16 to drop downwards away and from the canister carriage 18 as indicated by downward motion arrow 96 in FIG. 11.

Figure 12:
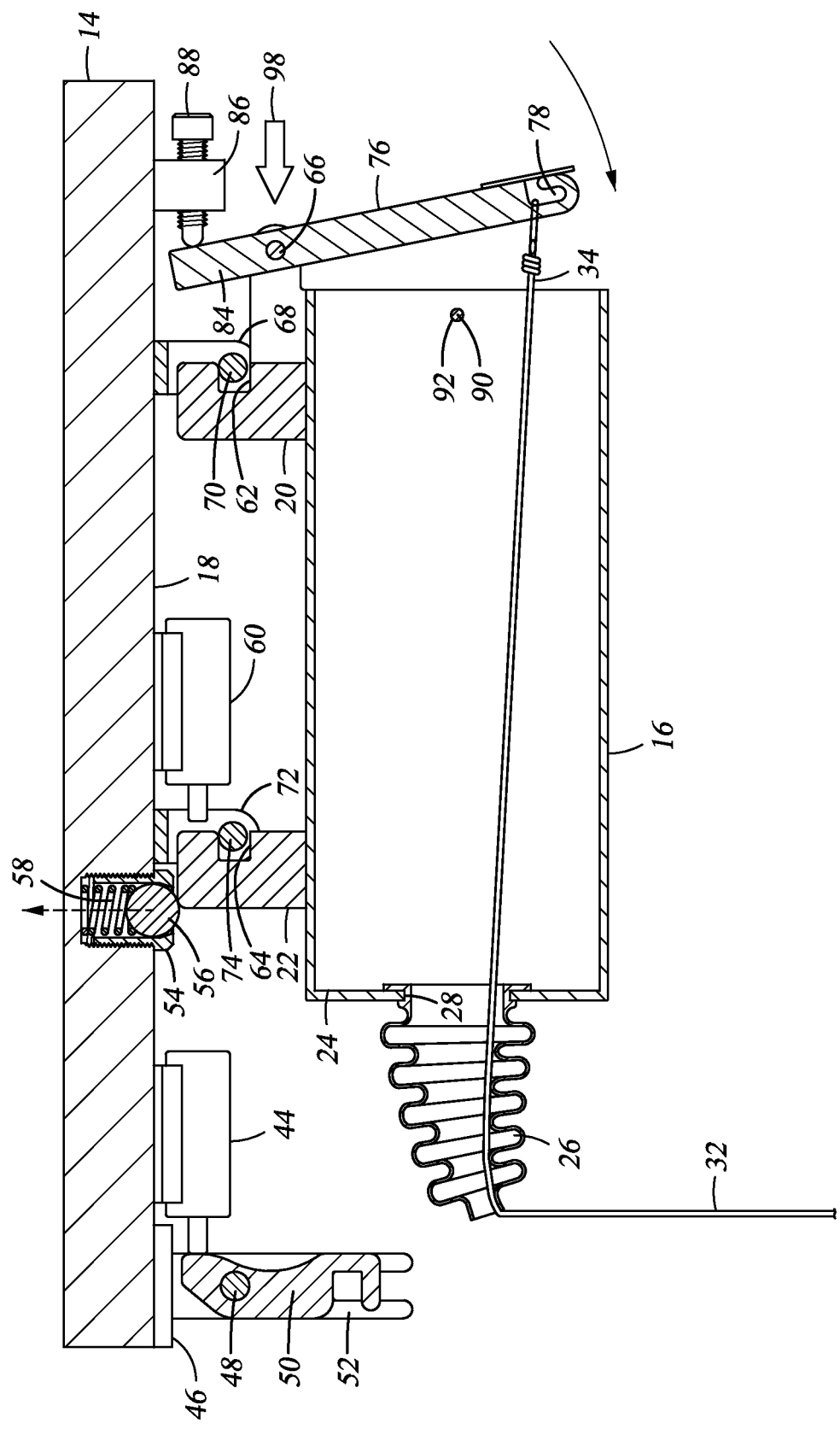
FIG. 12 is a cross section view similar to the view of FIG. 10 showing a first alternate embodiment wherein an adjustable mechanical end of string stop disposed as the end of string detector switch. In this first embodiment, the shot line being fully dispensed with the string outside end pulling the end of string canister release lever thereby rotating string canister release lever arm to contact the end of string stop and pushing the shot line canister rearward across the detent ball of the canister ball plunger facilitating the release the canister from the front and rear canister hangers.

In a second embodiment, as illustrated in FIG. 12, provides an alternate means for releasing the shot line canister 16. An end of string stop 86 is mounted to the bottom of the canister carriage 18 forward of the front end of the shot line canister 16 having a threaded end of string stop adjustment screw 88 received by a threaded bore in the end of string stop 86 and disposed in alignment with the longitudinal axis of the canister carriage 18. The adjustment screw 86 is arranged to contact the release lever arm 84 when the end of string release lever 76, being an end of string event, rotates downward and rearward pressing the release lever arm 84 against the end of string stop adjustment screw 86 thereby pushing the shot line canister 16 rearwards in a direction indicated by rearward motion arrow 98 disengaging the shot line canister 16 from the carriage canister front 68 and rear 72 latches thereby jettisoning the shot line canister 16.

The various elements of the undercarriage assembly 14 and the shot line canister 16 including the associated elements may be constructed of any suitable materials; however, the selection of materials is constrained by the lift limitations of the drone 12. Consequently, carbon fiber construction materials are for the shot line canister 16 and polymer and light weight metals or plastics are preferred for other elements.

I claim the following:

1. A line and cable stringing drone apparatus comprising:
    an unmanned aerial vehicle being a drone having a bottom surface, front and rear sides, and a radio receiver, and
    a canister undercarriage assembly having top and bottom surfaces, the top surface of the canister undercarriage assembly fixed to the bottom surface of the drone, the canister undercarriage assembly comprising:
        a canister carriage comprising a rectangular box shaped housing having front and rear ends, a length, a width, a height, a longitudinal axis and having top and bottom surfaces with the top surface of the canister carriage forming the top surface of the canister undercarriage assembly,
        a front canister hanger latch fixed to the bottom surface of the canister carriage near the front end of the canister carriage and having a front canister hanger latch pin,
        a rear canister hanger latch fixed to the bottom surface of the canister carriage and to the rear of the front canister hanger latch and having a rear canister hanger latch pin,
        a ball plunger assembly having a ball plunger spring and detent ball and being disposed within the bottom surface of the canister carriage and proximate to and rear of the rear canister hanger latch with the detent ball disposed downwardly,
        a shot line canister being a cylindrical shape, having a diameter, front and rear ends, and an outside surface, is disposed longitudinally below the canister carriage, the shot line canister further having a bottom surface forming the shot line canister rear end, the bottom surface of the shot line canister having a central bore receiving a polymeric gaiter extending rearwards from the shot line canister bottom surface, a front hanger having a forward facing front hanger slot, a rear hanger having a forward facing rear hanger slot, with the front and rear hangers disposed to extend upwards from the shot line canister outside surface and arranged with the front and rear hanger slots respectively receiving the front and rear canister hanger latches extending downwards from the bottom surface of the canister carriage and the rear shot line canister hanger contacting the ball plunger assembly detent ball; and,
        a shot line string spool disposed within the shot line canister having a string inside end and a string outside end with the string inside end being routed through the polymeric gaiter of the shot line canister.

2. The line and cable stringing drone apparatus of claim 1 wherein the canister carriage is further comprising;
   a shot line sinker latch disposed on the bottom surface of the canister carriage and proximate to the rear end of the canister carriage,
   a shot line sinker having a hanger tab with a hanger tab latch receiver detachably engaging the shot line sinker latch, and a hanger tab string bore receiving the shot line inside string end; and,
   a sinker latch release solenoid disposed proximate to the shot line sinker latch on the bottom surface of the canister carriage and being in direct electrical communication with the drone radio receiver is operable to open the shot line sinker latch to release the shot line sinker when activated by a user selectively issuing a sinker release command from a remote control radio transmitter, being in direct radio communication with the drone radio receiver, to open the shot line sinker latch.

3. The line and cable stringing drone apparatus of claim 1 further having a mechanism for releasing the shot line canister from the canister carriage comprising,
   an end of string detector stop having a stop adjustment screw, and,
   an end of string canister release lever having a bottom end, vertically pivotally attached to a release lever pin of the shot line canister front hanger and having a release lever arm being the top portion of the end of string canister release lever contacting the stop adjustment screw and arranged to press the stop adjustment screw displacing the shot line canister rearward being responsive to a rearward rotation of the bottom end of the string canister release lever being pulled by the shot line string outside end fixed to the bottom end of the end of string canister release lever and disengaging the shot line canister from the canister carriage thereby jettisoning the shot line canister.

4. The line and cable stringing drone apparatus of claim 1 further having a mechanism for releasing the shot line canister from the canister carriage comprising a canister jettison solenoid disposed on the bottom surface of the canister carriage proximate to the rear canister hanger and arranged to displace the shot line canister rearwards disengaging the canister hanger slots from the front and rear canister slots when activated, the canister jettison solenoid being in direct electrical communication with the drone radio receiver is operable to activate by a user selectively issuing a canister release command from a remote control radio transmitter, being in direct radio communication with the drone radio receiver, to the drone radio receiver to jettison the shot line canister.

5. The line and cable stringing drone apparatus of claim 4 wherein the mechanism for releasing the shot line canister from the canister carriage further comprises,
   an end of string detector switch having a switch plunger and mounted to the bottom and near the front end of the canister carriage housing, the end of string detector switch is in direct electrical communication with the drone radio receiver and the canister jettison solenoid, and,
   an end of string canister release lever having a bottom end, vertically pivotally attached to a release lever pin of the shot line canister front hanger and having a release lever arm being the top portion of the end of string canister release lever contacting the switch plunger and arranged to depress the switch plunger and to activate the end of string detector switch being responsive to a rearward rotation of the bottom end of the string canister release lever being pulled by the shot line string outside end fixed to the bottom end of the end of string canister release lever and activating the canister jettison solenoid.

6. The line and cable stringing drone apparatus of claim 1 wherein the shot line canister further comprises a removable shot line string spool retaining detent pin disposed across the diameter of the shot line canister near the front end.

7. A method of laying line and cable lead string utilizing the line and cable stringing drone apparatus of claim 2, comprising the steps of
   providing a shot line string spool inserted into the shot line canister with the inside string end routed through the polymeric gaiter and fixed to the shot line sinker,
   moving the drone to a first preselected location,
   releasing the shot line sinker, the shot line sinker being retrieved by a user,
   dispensing shot line string by moving the drone away from the first preselected location pulling the string inside end from the shot line string spool,
   moving the drone to a second preselected location whilst dispensing shot line string, and,
   retrieving the shot line canister thereby dispensing shot line string from a first preselected location to a second preselected location.

8. A method of laying line and cable lead string utilizing the line and cable stringing drone apparatus of claim 4, comprising the steps of
   providing a shot line string spool inserted into the shot line canister with the inside string end routed through the polymeric gaiter,
   moving the drone to a first preselected location,
   retrieving the inside string end by a user,
   dispensing shot line string by moving the drone away from the first preselected location pulling the string inside end from the shot line string spool,
   moving the drone to a second preselected location whilst dispensing shot line string,
   releasing the shot line canister, and,
   retrieving the shot line canister thereby dispensing shot line string from a first preselected location to a second preselected location.

* * * * *